United States Patent [19]
Roundy et al.

[11] Patent Number: 5,440,338
[45] Date of Patent: Aug. 8, 1995

[54] METHOD AND APPARATUS FOR IMPROVING DIMENSIONAL MEASUREMENTS MADE WITH VIDEO CAMERAS

[75] Inventors: Carlos B. Roundy; Gregory E. Slobodzian; Kurt Jensen, all of Logan, Utah

[73] Assignee: Spiricon, Inc., Logan, Utah

[21] Appl. No.: 60,575

[22] Filed: May 11, 1993

[51] Int. Cl.⁶ .................. H04N 5/21; H04N 17/00
[52] U.S. Cl. .................. 348/180; 348/184; 348/185; 348/193
[58] Field of Search .............. 358/213.15, 213.16, 358/107, 93, 2, 209, 95, 90, 110, 113, 139, 167; H04N 5/21, 17/00; 348/175, 184, 180, 187, 193, 162, 571, 618, 619, 622, 624

[56] References Cited

U.S. PATENT DOCUMENTS

| | | | |
|---|---|---|---|
| 4,303,943 | 12/1981 | May | 348/619 |
| 4,388,637 | 6/1983 | Blair | 348/184 |
| 4,442,455 | 4/1984 | Huignard, et al. | 358/90 |
| 4,523,229 | 6/1985 | Kanmoto | 348/619 |
| 4,652,909 | 3/1987 | Glenn | 358/41 |
| 4,760,537 | 7/1988 | Martin et al. | 364/518 |
| 4,855,829 | 8/1989 | Kihara | 348/627 |
| 4,879,598 | 11/1989 | Seto | 358/113 |
| 4,906,097 | 3/1990 | Wiedemann | 356/375 |
| 4,972,266 | 11/1990 | Tani | 358/213.16 |
| 5,047,861 | 9/1991 | Houchin et al. | 358/213.15 |
| 5,060,081 | 10/1991 | Shimura | 358/110 |
| 5,144,430 | 9/1992 | Boelart | 348/184 |
| 5,172,216 | 12/1992 | Suzuki et al. | 348/184 |
| 5,223,932 | 6/1993 | Thomas et al. | 348/571 |
| 5,260,775 | 11/1993 | Farouda | 348/619 |

Primary Examiner—Tommy P. Chin
Assistant Examiner—Vu Le
Attorney, Agent, or Firm—Thorpe North & Western

[57] ABSTRACT

Video cameras, such as charge coupled device cameras, are used for optically making spatial measurements. For example, such cameras are used for laser beam analysis. Such cameras also have drawbacks including baseline offset error and poor signal-to-noise ratio. By adjusting the baseline so that both noise and the desired signal produce only positive digital counts, deriving a baseline offset level with only noise, and then subtracting the baseline offset level from subsequent frames Containing data representing both noise and the desired signal, the baseline offset is corrected. With the baseline offset being corrected, signal-to-noise ratio improving techniques, such as frame averaging and results averaging, can be applied to extract the desired signals which would otherwise be buried in the noise. The method and apparatus is particularly suited to laser beam performance evaluations.

18 Claims, 7 Drawing Sheets

METHOD AND APPARATUS FOR IMPROVING DIMENSIONAL MEASUREMENTS MADE WITH VIDEO CAMERAS

BACKGROUND

1. The Field of the Invention

This invention relates to devices and methods used to make dimensional measurements using video cameras. More particularly, the present invention relates to dimensional measurements of a laser beam which is used to determine important parameters of the laser beam.

2. The Prior Art

A variety of video cameras accompanied by appropriate signal processing equipment are advantageously used to make quantitative linear dimensional measurements in scientific and industrial fields. For example, video cameras based upon charge coupled devices (CCD) and vidicon devices are commonly used to make dimensional measurements.

Cameras based upon CCD and vidicon devices are rugged apparatus with many desirable characteristics for use in making quantitative dimensional measurements. One application in which such cameras are used is in laser beam analysis and diagnostics. While lasers have become ubiquitous in commercial, industrial and scientific fields, each individual laser commonly used in such fields produces a beam of characteristic parameters. For example, laser beam parameters such as the beam's intensity profile as well as other quantitative dimensional measurements must be individually determined and adjusted in many cases.

CCD cameras in particular have become popular as a tool for conducting laser beam diagnostics measurements. The ability of the CCD camera to simultaneously measure the entire surface area of the beam and perform detailed spatial measurements makes it well suited for conducting laser beam diagnostics. These cameras are used by scientists and engineers who are either designing lasers or who are using lasers in applications where the spatial profile of the laser beam is critical.

Cameras using CCD and vidicon devices, in conjunction with commercially available digitizing and processing electronics, provide primarily two desirable features. First, they provide a picture of the beam profile so that the engineer or scientist can effectively see what the laser beam profile looks like. The fast response of such cameras and signal processing equipment provides this picture in real time and in both 2D and 3D modes. The user thus gains an insightful, intuitive perspective on the laser beam characteristics.

Secondly, the signal processing equipment, e.g., digitizing electronics, are able to extract detailed quantitative measurements on laser beam characteristics from the data provided by the camera. Such detailed quantitative measurements allow a user to precisely determine the properties of the laser beam and to make incremental adjustments and improvements in its performance.

Such video cameras, in spite of their advantages, possess certain characteristics that limit the precision with which laser beam diagnostics can be carried out. CCD cameras and vidicon cameras have some characteristics that limit their usefulness in laser beam diagnostics and in other industrial quantitative measurement applications. First, CCD cameras and vidicon camera typically have a low signal-to-noise ratio, even when the signal is approaching saturation, which causes problems in obtaining precise measurements under varying camera conditions.

Second, CCD cameras and vidicon cameras possess a measurement error resulting from a fixed baseline offset error inherent in the camera. The fixed baseline offset error exacerbates the seriousness of the low signal-to-noise ratio.

These inherent characteristics have limited the ability of commercial grade CCD cameras and vidicon cameras to make accurate measurements only when the signal produced by the camera is very close to saturation and only when the signal covers a relatively large area of the camera surface.

The problems encountered with CCD cameras and vidicon cameras are accentuated in laser beam diagnostics applications because the dimensions of the laser beam impinging upon the light sensitive surface of the camera is highly dependent upon low level intensities in the wings, or outer regions, of the beam where the signal-to-nose ratio is inherently very low and may even be less than one. In contrast, the integrated total energy in the wings can be significant due to the relatively large area of the wings of some laser beams. In cases where the wing portion of the laser beam is large or exhibits high energy the noise which is inherent in cameras, especially in the presence of baseline offset error, can create very large errors in calculated beam dimensions.

In view of the foregoing, it would be an advance in the art to provide a method and apparatus which overcomes the noted problems and provides improved dimensional measurement using commercially available video cameras.

BRIEF SUMMARY AND OBJECTS OF THE INVENTION

In view of the above described state of the art, the present invention seeks to realize the following objects and advantages.

It is a primary object of the present invention to provide a method and apparatus for correcting deficiencies in video cameras used for performing dimensional measurements.

It is also an object of the present invention to provide a method and apparatus for correcting baseline offset inherent in CCD cameras and vidicon cameras without losing any signal components that may otherwise be obscured due to noise.

It is another object of the present invention to provide a method and apparatus for improving the results of using video cameras in laser beam diagnostics and performance evaluations.

It is a further object of the present invention to provide a method and apparatus for improving the linear measurement of a laser beam profile using a video camera where the laser beam exhibits low intensity wings.

It is another object of the present invention to provide a method and apparatus for correcting baseline offset error and poor signal-to-noise ratio inherent in CCD cameras and vidicon cameras without losing any signal components that may otherwise be obscured due to noise.

These and other objects and advantages of the invention will become more fully apparent from the description and claims which follow, or may be learned by the practice of the invention.

The present invention provides a method and apparatus for improving the performance of video cameras used to make linear dimensional measurements. The present invention is particularly well suited for improving dimensional measurements of laser beams using CCD cameras and vidicon cameras. Such cameras have particular drawbacks of baseline offset error and poor signal-to-noise ratio.

The method of the present invention provides that the baseline offset error is corrected without the loss of any signal components that may otherwise be obscured due to noise. According to one aspect of the preferred correction method, the baseline of the signal is raised above the digitizer's zero level, an average baseline without an input signal present is determined, and then subtracting the average baseline from the subsequently obtained signals. The subtraction process is performed such that the subsequent frames in memory retain all negative signal components, as well as positive signal components, and thus there is no loss of the desired signal. Any subsequent quantitative measurements consider both the positive and negative signal components and thus measurements are made as accurately as possible. Any baseline offset errors are eliminated. After the baseline error is corrected, one or more of a number of noise reduction methods are implemented to improve the signal-to-noise ratio.

One method for improving the signal-to-noise ratio comprises the steps of obtaining a plurality of frames each representing both noise and an optical signal and then averaging the plurality of frames together to provide a representative signal wherein the optical signal is extracted from the noise. Another method for improving the signal-to-noise ratio comprises the steps of determining a plurality of resulting spatial measurement representations based upon the noise and optical signal and averaging the plurality of linear measurement representations wherein the signal is extracted from the noise.

In another aspect of the present invention, an apparatus for improving the performance of video cameras used for making linear dimensional measurements is provided. The video camera provides an output signal comprising both noise and an optical signal. A means for acquiring the output signal from the video camera and a means for digitizing the optical signal contained in the output signal is provided. Also provided are means for adjusting the baseline of the received signal such that all noise is represented by positive going counts and such that the mean of the baseline is centered at a predetermined positive integer digital count to arrive at a reference baseline level and means for subtracting the reference baseline from subsequent frames to correct for baseline error.

Also provided to improve the signal-to-noise ratio of the output signal are a means for obtaining a plurality of frames each representing both noise and an optical signal and means for averaging the plurality of frames together to provide a representative signal wherein the optical signal is extracted from the noise.

Another apparatus to improve the signal-to-noise ratio comprises means for determining a plurality of resulting linear measurement representations based upon the noise and optical signal and means for averaging the plurality of linear measurement representations wherein the optical signal is extracted from the noise.

Still another apparatus to improve the signal-to-noise ratio of the output signal comprises means for providing an aperture around the optical signal. Yet another apparatus for improving the signal-to-noise ratio of the output signal comprises means for averaging a line in the video camera. An even further apparatus for improving the signal-to-noise ratio of the output signal comprises means for averaging an area in the camera.

BRIEF DESCRIPTION OF THE DRAWINGS

In order to better appreciate how the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which.

DETAILED DESCRIPTION OF THE PREFERRED EMBODIMENTS

In the following description, measurement of the width of a laser beam will be used to explain the present invention. Measuring the width of a laser beam results in the problems of baseline offset error and noise being most serious. Significantly, the method and apparatus of the present invention apply to other quantitative dimensional measurements made with CCD cameras or vidicon cameras accompanied by appropriate signal processing apparatus. For example, the present invention can be applied in any application using video cameras to optically make quantitative dimensional measurements where the video camera baseline error can distort the measurement.

With regard to CCD cameras and vidicon cameras, CCD cameras are generally a good choice for use in laser beam analysis systems. CCD cameras have many desirable characteristics that make them a good choice for spatial profile measurements of laser beams. Some of these desirable characteristics are: Simultaneous matrix, whole beam measurement; Relatively high resolution, as low as 9 $\mu$m per pixel; Linear output signal vs. input power; Wide spectral coverage from 190 nm to 1.1 $\mu$m; Relatively uniform responsivity over the sensor surface; A CCD apparatus is a rugged solid-state device; Commercially available CCD cameras are relatively inexpensive and provide high performance.

An apparatus for laser beam analysis generally includes a video camera with associated optics and signal processing electronics including devices such as a digitizer, general purpose processor, a display, and other devices known in the industry.

As indicated earlier, CCD cameras inherently have deficiencies that limit their ability to provide high precision measurements of laser beam characteristics. In order to obtain accurate laser beam measurements, such deficiencies which heretofore have been unrecognized or accepted as inevitable in the industry, must be overcome.

One principal deficiency of CCD cameras is the relatively low saturation level. The relatively low saturation level results in a low signal-to-noise ratio, even when the signal is close to the saturation level of the CCD camera. The problem of low signal-to-noise ratio becomes even more acute under conditions where the signal cannot be adjusted so that it is close to the saturation of the camera or when gathering information on the relatively low intensity wing portions of a laser beam.

CCD cameras typically have a signal-to-noise ratio of about 300 when comparing peak signal at saturation to RMS noise. In this case, the RMS noise is equivalent to the 1 sigma level of the standard deviation of the noise distribution. While a signal-to-noise ratio of 300 appears adequate for many applications, in laser beam measurement applications such a characteristic translates to a peak-to-peak signal-to-noise ratio of only about 50, where the peak-to-peak signal level is typically plus or minus three standard deviations.

This high noise level, equivalent to 2% of saturation of the laser beam, inhibits accurate measurements of beam characteristics especially in the wings of the laser beam where signal levels are small. An adequate signal-to-noise ratio is particularly important when making laser beam diameter measurements since the diameter of a laser beam is typically defined to include the $1/e^2$ point, or the point on the laser beam profile in the wing where the intensity is only 13.5% of the peak intensity.

Significantly, if the signal-to-noise ratio is 50 at the peak, the signal-to-noise ratio at the $1/e^2$ point of the laser beam may be as low as about 7. If the peak signal were only 50% of saturation, the signal-to-noise ratio at the $1/e^2$ point would deteriorate to as low as 3. This low signal-to-noise ratio can have a serious effect on the measurement of laser beam diameter.

The inherent high noise level present in CCD cameras, in addition to influencing the accuracy of measurements, also compels the use of cumbersome beam attenuation optics. Since both the signal-to-noise ratio and the dynamic range of CCD cameras is low, it is generally necessary to adjust the laser beam energy to be very near saturation for each measurement. If a series of measurements are being made, wherein the beam intensity changes significantly, then adjusting the beam close to saturation can become very time consuming and cumbersome.

Another serious drawback of CCD cameras is variation in the camera baseline offset, or zero signal level. Since all signal levels are measured riding on the baseline offset, errors in the offset adjustment can directly affect measurement of beam profile properties.

The baseline offset adjustment of the CCD camera influences measurements with the camera for a number of reasons. For example, the camera offset level drifts with time, with temperature of the environment, with aging, and especially during the first 1-2 hours as the camera heats up after being turned on.

Any shift or drift in offset is especially serious in the case of two laser beam measurement conditions. The first measurement condition where shift or drift in offset is especially serious is when the laser beam is low intensity thus resulting in low level signals. Under low signal levels the signal-to-noise ratio is poorer and the effect of offset errors are multiplied on any dimensional measurements which are made.

The second measurement condition occurs when very small laser beams, that cover only a few pixels, are being measured. In the case of very small laser beams, a small error in the baseline, averaged over all the pixels, can create a greater signal than the laser beam itself.

Figure 1:
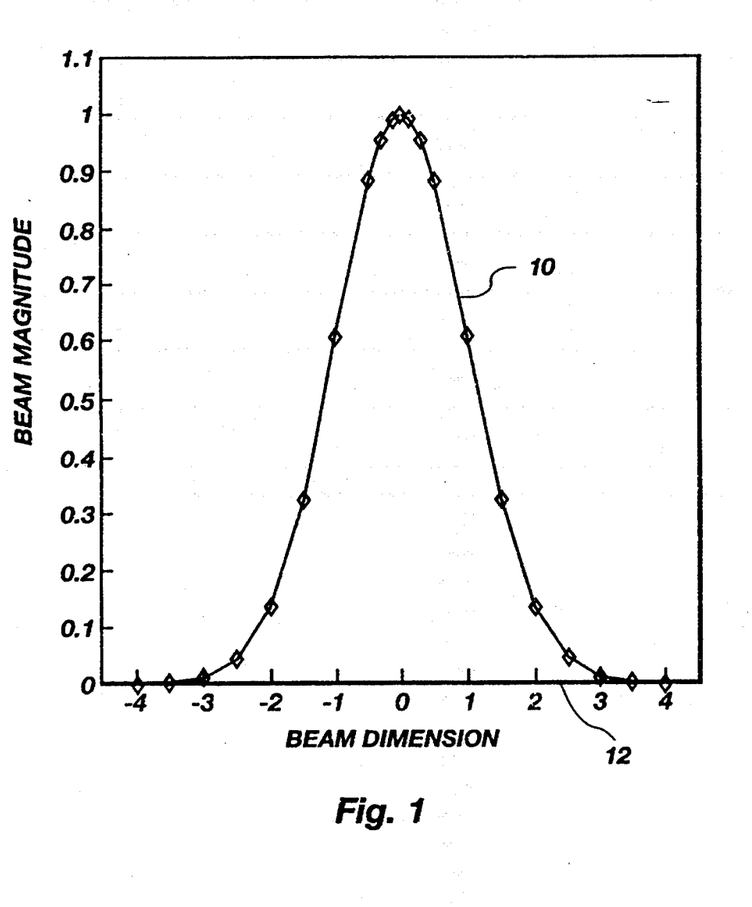
FIG. 1 is a graphical representation of laser beam signal strength and its relationship to the digitizer baseline in a theoretical measurement system.

The problems caused by baseline offset and noise encountered when measuring laser beam intensity profiles and dimensions will be explained by referring to FIGS. 1-4. FIG. 1 illustrates a typical profile of a laser beam assuming a perfect camera with zero noise. Also, FIG. 1 assumes that the baseline is flat and adjusted perfectly so that measurements can be made precisely on the energy in the laser beam. In FIG. 1, as well as in FIGS. 2-4, the laser beam signal is represented by the curve 10 and the digitizer baseline is represented by the horizontal line 12.

Figure 2:
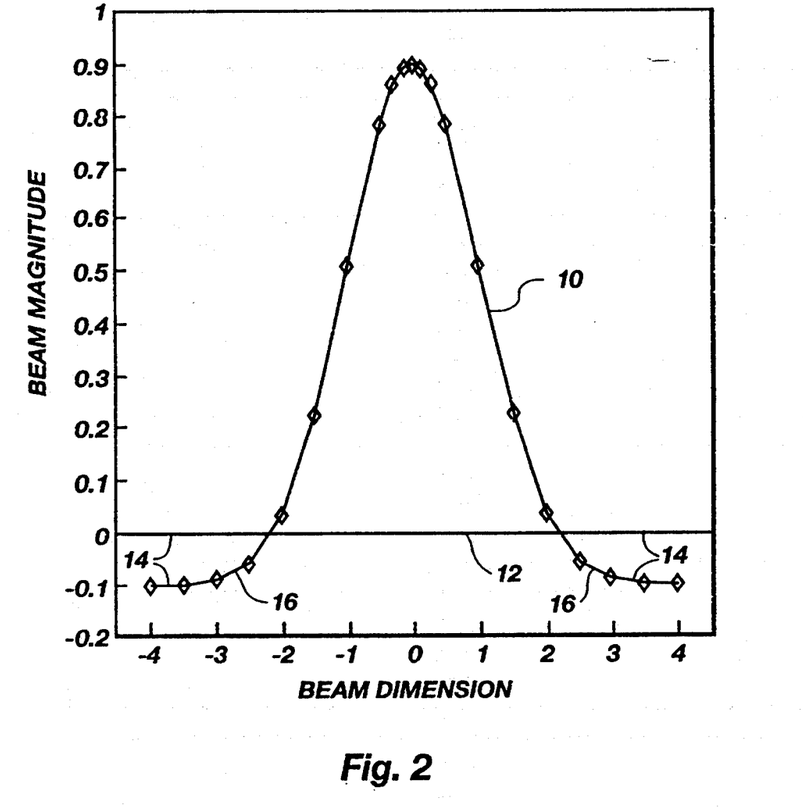
FIG. 2 is a graphical representation of laser beam signal strength and its relationship to the digitizer baseline where the baseline offset is too low.
Figure 3:
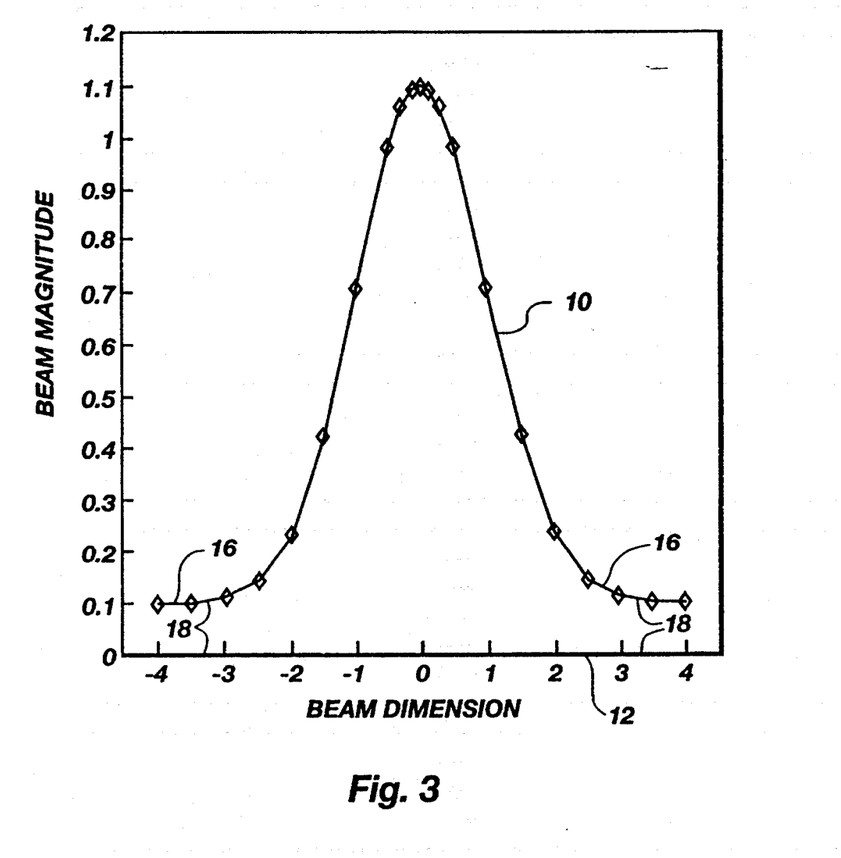
FIG. 3 is a graphical representation of laser beam signal strength and its relationship to the digitizer baseline where the baseline offset is too high.

FIGS. 2 and 3 illustrate a laser beam in the presence of baseline offset. In FIG. 2 the baseline offset, represented by gap 14, is adjusted too low and the low intensity wings 16 of the laser beam are suppressed below the digitizer zero cutoff. Thus, information in the wings 16 is suppressed, and any resulting measurement of beam width will be smaller than the actual laser beam width.

In FIG. 3, the baseline offset, represented by gap 18, is adjusted too high so that even where there is zero actual signal the digitizer would output a positive count or signal. In the case represented by FIG. 3, any resulting dimensional measurement on a laser beam would result in a beam width measurement which is larger than the actual beam width.

Figure 4:
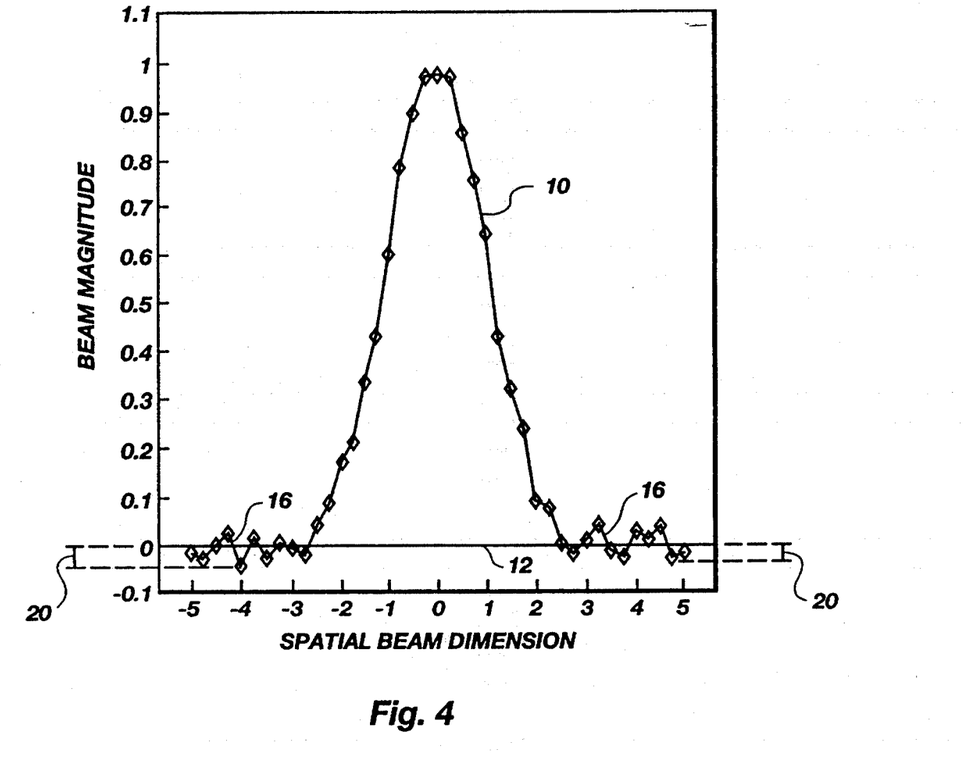
FIG. 4 is a graphical representation of laser beam signal strength and its relationship to the digitizer baseline where the baseline offset is correct but noise is present on the signal.

FIG. 4 illustrates the situation where the baseline offset is correctly adjusted but noise inherent in CCD cameras is present. With the presence of noise, some components 20 of the laser beam signal 10 are suppressed below the digitizer baseline 12 and thus are lost.

Techniques have been proposed in the past to partially compensate for baseline offset and noise encountered when measuring laser beam dimensions. One technique is referred to in the art as "reference frame subtraction" or "baseline reference subtraction" and another technique is referred to in the art as "signal averaging."

In the case of FIG. 3, where the baseline offset is too high, reference frame substraction requires that data representing a signal frame with no laser beam signal present be stored in memory and that frame be subtracted from every subsequent frame which has the laser beam signal present. Disadvantageously, these previous reference frame subtraction techniques only result in the case of FIG. 4 wherein noise is present and the negative noise components are discarded. This causes laser beam signal levels 20 below the baseline 12 to be suppressed and lost.

In addition, the reference frame subtraction technique works to correct baseline offset only when the baseline offset is too high as in the case represented in FIG. 3. In the case of the baseline offset being too low, as represented in FIG. 2, it is not possible to digitize signal portions below the zero baseline 12, and therefore there is no possibility of subtracting a negative baseline offset.

At best, reference frame subtraction can only remove gross errors in the baseline offset if the errors are in the positive direction. That is, only if the baseline level is higher than the zero digitizer level. If, however, the baseline is in the opposite direction, that is, it is negative from the zero digitizer level, then it is impossible to detect how much baseline offset exists, and the previously available reference frame subtraction technique cannot correct for such offset.

When signal averaging is used for improving signal-to-noise ratio in laser beam analysis, the laser beam signal is averaged over multiple frames resulting in a suppression of noise. Disadvantageously, whenever the averaging is performed with ideal baseline adjustment as in FIG. 4, many of the negative signal components are sill lost and the averaging does not adequately correct for any signal components below zero.

Thus, with standard CCD and vidicon cameras and standard digitizers commonly used in the industry, there is no way to adequately correct for baseline offset and noise; especially for accurate dimensional measurements. This is especially true in the case of measurement of laser beams where a significant amount of information in the beam can be contained in the low intensity wings. The low intensity information in the wings cannot be recovered by averaging or baseline subtraction due to loss of the negative signal components in the digitizer.

In accordance with the present invention, a method and apparatus is provided which compensates for both low signal-to-noise ratio and baseline offset error inherent in CCD cameras and other video cameras. It is preferred that digital signal processing techniques be used to implement the present invention and minimize the effects of poor signal-to-noise ratio and baseline offset error. Those skilled in the art will be able to use the information provided herein to arrive at appropriate programming code for use in processors to carry out the present invention. Using the method and apparatus described herein, it becomes possible to make accurate dimensional measurements not previously possible. By use of the present invention, CCD cameras and vidicon cameras can be used to make dimensional measurements which would not otherwise be possible with such cameras.

The present invention advantageously provides baseline error correction and reduction of noise (improvement of signal-to-noise ratio). The method and apparatus of the present invention corrects for baseline offset error and for low signal-to-noise ratio while preserving the signal components which are buried in the noise. By preserving the signal components which would otherwise be obscured by the noise, such signal components can be recovered and used to make measurements.

Figure 5:
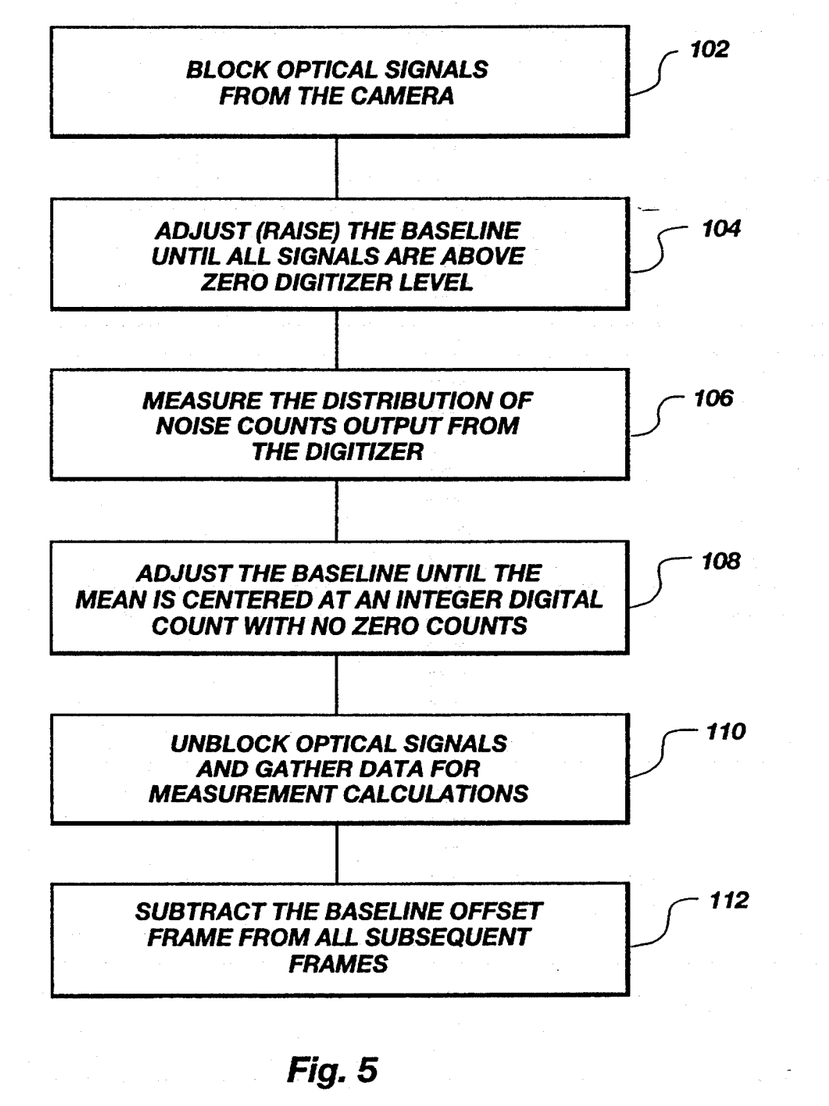
FIG. 5 is a flow chart showing the preferred steps for carrying out the baseline error correction method of the present invention.

In accordance with the method of the present invention, the steps of one preferred method for correcting the baseline error are represented in FIG. 5. To correct the baseline offset error inherent in the camera, all optical signals, i.e., the laser beam, are first blocked from the camera (Step 102). Blocking of the optical signals allows the baseline to be corrected in the absence of any laser beam signal.

The baseline is next raised, including noise, until all signals are above the zero digitizer level, that is, until there are no zero or negative digitizer counts (Step 104). Thus, all signal components are obtained when digitizing the signal. This is in contrast to the result of losing low level signals when using the previously available techniques.

In accordance with the present invention, a preferred method used to calibrate the amount the offset should be raised will be described. One preferred calibration method involves adjusting the baseline offset and then measuring the distribution of noise counts (Step 106). The noise found in the output of a CCD camera typically exhibits a Gaussian distribution and is centered at a given count with a plus and minus deviation above and below the mean. The baseline is adjusted (incrementally either by adjusting the camera or using digital processing) until the mean is centered at an integer digital count with no zero counts (Step 108). Stated another way, the baseline is adjusted such that there is an equal number of pixel counts (representing noise only) above the mean as there are below the mean. The mean of the noise counts, n, is then subtracted from each frame to obtain an average zero count in the measurement of the entire frame. This subtraction process is done, maintaining minus noise component levels, so that no information component is lost. Once the baseline offset is adjusted so that the mean is centered at an integer digital count, it becomes possible to subtract this mean digital count from all signal components. The optical signal is then unblocked (Step 110) and data for measurements is gathered to form additional frames and the baseline offset is subtracted therefrom (Step 112). Stated another way, the baseline offset is subsequently subtracted from all subsequent signal frames to correct the baseline offset error.

In contrast to the previously available techniques, the subtraction step of the present invention preserves negative signal counts as well as positive signal counts, and thus none of the laser beam signal is lost. With the baseline properly adjusted, measurements can be made on beam widths with all components, both positive and negative, being preserved in memory following the subtraction process.

It will be appreciated by those skilled in the art that the baseline error correction method of the present invention is most preferably carried out using digital signal processing techniques. It is, however, within the scope of the present invention to carry out the method of the present invention using analog signal processing techniques or a combination of digital and analog processing techniques.

In addition to baseline error correction, it is within the scope of the present invention to carry out further steps to improve the signal-to-noise ratio. Similarly to the method of correcting baseline error, the subsequent signal processing carried out to improve the signal-to-noise ratio is conducted so that substantially no laser beam signal components are lost.

Once the baseline error has been corrected in accordance with the present invention without suppressing any negative laser beam signal components, other techniques for improving signal-to-noise ratio, and thus dimensional measurement accuracy, can be carried out within the scope of the present invention. The preferred steps which can be carried out to improve the signal-tonoise ratio which are combined with the steps for correcting baseline error will be explained below. It will be appreciated that while some of the steps carried out to improve the signal-to-noise ratio have been proposed in the art, their combination with the baseline error correction method of the present invention provides results not heretofore available or suggested in the art.

As is known, the noise which is present on a given pixel is random and has a normal distribution in its magnitude over time. Also, there is a random noise component of all the pixels in a given frame that is also a normal distribution about a mean noise level. That is, summing all the pixels in the entire frame will yield a mean with a normal distribution. The laser beam signal to be measured effectively rides on top of the baseline offset and is emersed in the random noise pattern.

Figure 5A:
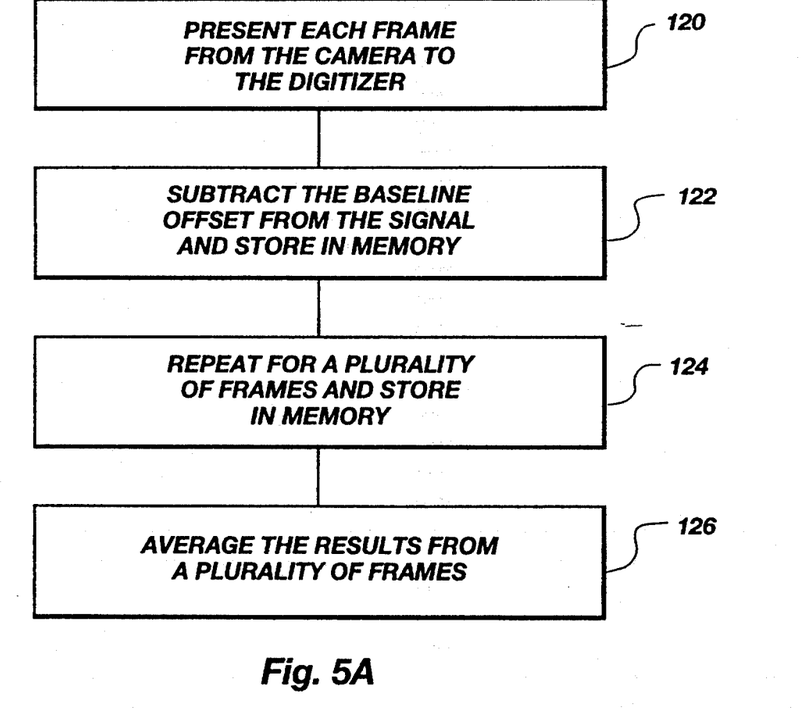
FIG. 5A is a flow chart showing the preferred steps for carrying out the frame averaging method in accordance with the present invention to improve signal-to-noise ratio.

One preferred method for use in combination with the preferred baseline error correction method of the present invention is referred to as frame averaging. Referring to FIG. 5A, the preferred steps for carrying out frame averaging for improving signal-to-noise ratio are represented.

Each frame from the CCD camera with signal present is input to the digitizer (Step 120). The baseline offset level is subtracted from the signal and the resulting information is stored in memory (Step 122). With the preferred frame averaging method of the present invention, the above steps are repeated for a plurality of frames (Step 124), each of the frames retaining the positive as well as all negative signal components, and the data for the multiple frames is averaged (Step 126). Thus, the frame averaging method is able to improve the signal-to-noise ratio without losing any signal components. Typically, the frame averaging method of the present invention described herein can be expected to improve the signal-to-noise ratio by the square root of the number of frames averaged.

Regarding the use of the frame averaging method, when a laser beam is jittering in position, but not in size, the frame averaging method can result in errors. Typically, a laser beam which is jittering in position but not in size and on which frame averaging is carried out would result in measurements indicating a larger beam dimension than was actually present.

Figure 5B:
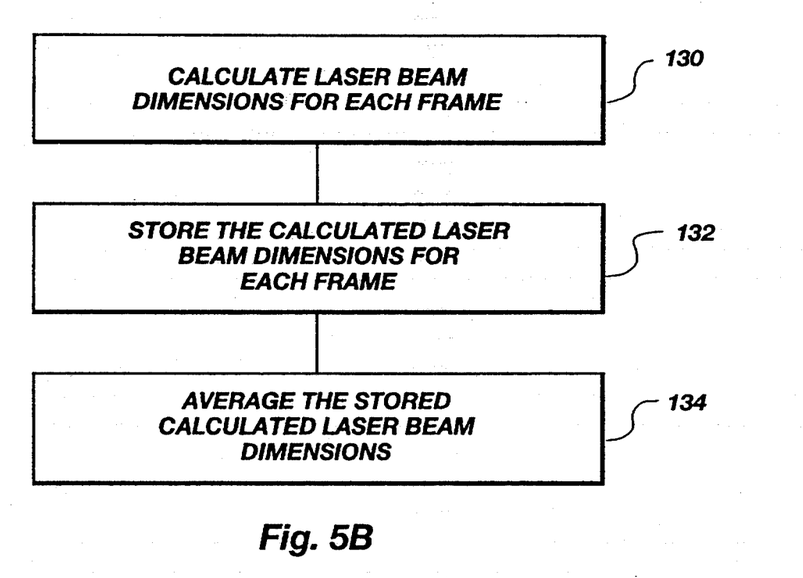
FIG. 5B is a flow chart showing the preferred steps for carrying out the results averaging method in accordance with the present invention to improve signal-to-noise ratio.

Another preferred method for use in combination with the described baseline error correction method of the present invention is referred to as results averaging. Referring to FIG. 5B, the preferred steps for carrying out the results averaging method for improving signal-to-noise ratio are represented. The results averaging method provides more accurate results than the frame averaging method when the laser beam is jittering in position, but not in size.

Using results averaging, the laser beam dimensions of each individual frame are calculated (Step 130) and the calculated laser beam dimensions for each individual frame are stored (Step 132). The stored laser beam dimensions are then averaged (Step 134). The results averaging method of the present invention described herein can be expected to improve the signal-to-noise ratio as the square root of number of frames averaged.

A further preferred method for use in combination with the preferred baseline error correction method of the present invention is referred to as area averaging. The area averaging method can be used to improve many measurement made on laser beams. For example, a beam diameter measurement may sum all signal components above a certain threshold level and a diameter is calculated from the sum of pixels. In this case, the noise is suppressed by the averaging process that comes from summing areas. Using the area averaging method, the signal-to-noise ratio improves as the square root of the number of pixels in the area.

A still further preferred method for use in combination with the preferred baseline error correction method of the present invention is referred to as line averaging. The line averaging method measures, for example, an equivalent knife edge passing across the laser beam. The line averaging method of the present invention includes the average of all the pixels in a given line which is used to calculate the dimensions of the laser beam. With the line averaging method the signal-to-noise ratio improves as the square root of the number of pixels in the line.

Yet another preferred method for use in combination with the preferred baseline error correction method of the present invention places an aperture about the area to be measured. For example, apertures drawn around small beams can remove additional noise found beyond the wings.

The methods of frame averaging, line averaging, area averaging, and results averaging reduces the influence of noise which can cause errors in laser beam dimension measurements.

It will also be appreciated that it is within the scope of the present invention to use a combination of the above described methods. For example, line averaging and area averaging can be used in conjunction with frame averaging or results averaging, even further in combination with aperture methods, to obtain maximum improvement possible in signal-to-noise ratio and dimensional measurement accuracy. Those skilled in the pertinent art will be able to determine the extent and quantity of data which should be considered in any averaging method such as those described above.

With the methods described above, accurate dimensional measurements can be performed on laser beams using CCD cameras. In making these dimensional measurements, using both positive and negative signal components, measurements can be made to a high degree of accuracy with no loss of signal representing the wings of the laser beam.

Figure 6:
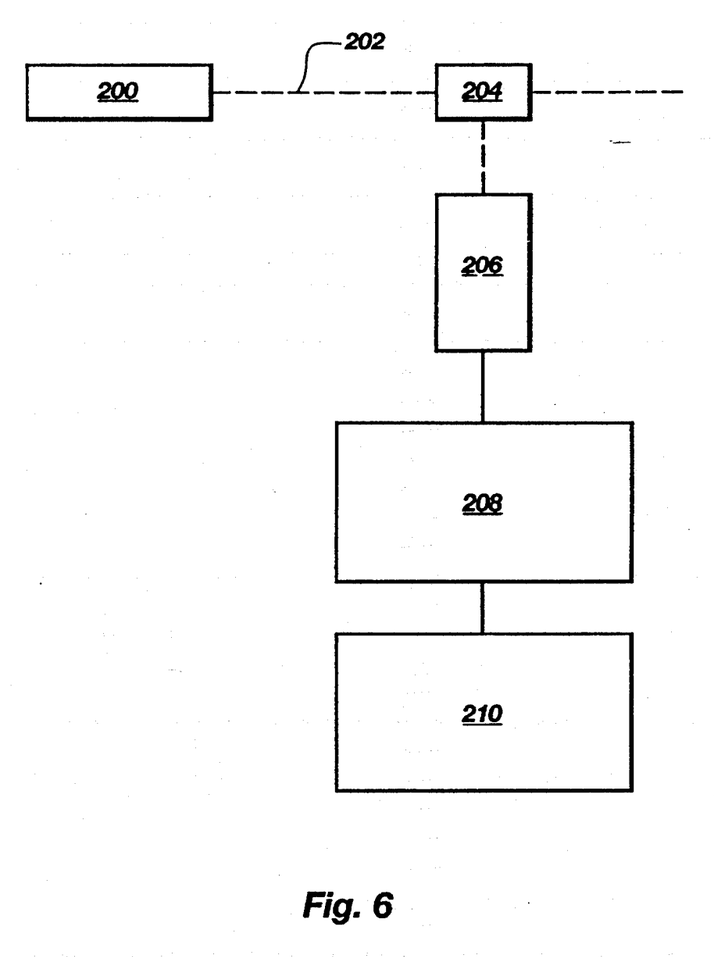
FIG. 6 is a block diagram representing one presently preferred apparatus of the present invention.

Reference will next be made to FIG. 6 which is a high level block diagram of the presently preferred apparatus of the present invention. It will be appreciated that those skilled in the art can derive many different particular embodiments of the present invention utilizing the block diagram of FIG. 6 and the other information contained herein.

In FIG. 6 a laser 200 is represented. The laser 200 can be any one of a number of laser devices such as continuous wave or pulsed lasers operating in any of a number of frequency ranges. The laser beam 202 emitted from the laser 200 is subjected to a beam splitter 204 to attenuate the intensity of the laser beam 202 and to perform any other necessary optical operations on the laser beam 202.

A portion of the laser beam 202 is diverted to a video camera 206. The video camera 206 can be any one of a number of available video cameras including CCD cameras, vidicon cameras and pyroelectric vidicon cameras. The data output from the camera 206 is input to a processor 208. The processor 208 preferably includes a digital microprocessor, digital memory, a non-volatile mass storage device, and user input devices as are known in the art. An 8-bit analog to digital convertor, which generates 256 digital levels, is preferably included in the processor 208. The 8-bit analog to digital convertor is preferably a single-ended 8-bit digitizer, which digitizes only positive going signals, as is commercially available. Other digitizers and other electronic devices can also be used within the scope of the present invention.

The processor 208 is preferably provided with means for communicating with other devices such as a personal computer and a printer (not illustrated). A video monitor 210 provides real time graphical representation and graphical data derived from the laser beam. Information such as beam energy, beam location, beam dimensions, elliptical dimensions, whole beam Gaussian fit, elliptical beam Gaussian fit, top hat measurements, divergence measurement, aperture calculation and display.

In view of the foregoing, it will be appreciated that the present invention provides a method and apparatus for correcting deficiencies in video cameras used for performing dimensional measurements and for correcting baseline offset inherent in CCD cameras and vidicon cameras without losing any signal components that may otherwise be obscured due to noise. The present invention also provides a method and apparatus for improving the results obtained using video cameras in laser beam diagnostics and performance evaluations as well as a method and apparatus for improving the spatial measurement of a laser beam using a video camera where the laser beam exhibits low intensity wings. The present invention also provides a method and apparatus for correcting baseline offset error and poor signal-to-noise ratio inherent in CCD cameras and vidicon cameras without losing any signal components that may otherwise be obscured due to noise.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by Letters Patent is:

1. A method for improving the performance of video cameras used for making linear dimensional measurements in conjunction with a digitizer having a baseline, the dimensional measurements being made in accordance with a received optical signal, the method comprising the steps of:
   adjusting the baseline of a signal output by a video camera such that all noise is represented by positive counts and the mean of the baseline is centered at a predetermined positive digital integer count to arrive at a baseline offset value; and
   subtracting the baseline offset value from subsequent frames to correct for baseline error while maintaining both positive and negative signals from the subtraction process such that no received optical signal components are lost.

2. A method for improving the performance of video cameras as defined in claim 1 further comprising the step of improving the signal-to-noise ratio of the signal output from the video camera.

3. A method for improving the performance of video cameras as defined in claim 2 wherein the step of improving the signal-to-noise ratio comprises the steps of:
   obtaining a plurality of frames each representing both noise and an optical signal; and
   averaging the plurality of frames together to provide a representative signal wherein the optical signal is extracted from the noise.

4. A method for improving the performance of video cameras as defined in claim 2 wherein the step of improving the signal-to-noise ratio comprises the steps of:
   determining a plurality of resulting spatial measurement representations based upon the noise and optical signal; and
   averaging the plurality of linear measurement representations wherein the optical signal is extracted from the noise.

5. A method for improving the performance of video cameras as defined in claim 2 further comprising the step of averaging a line in the video camera.

6. A method for improving the performance of video cameras as defined in claim 2 further comprising the step of averaging an area in the camera.

7. A method for improving the performance of video cameras as defined in claim 1 wherein the step of adjusting the baseline of said signal output by the video camera comprises the step of adjusting the baseline of a signal output by a CCD camera.

8. A method for improving the performance of video cameras as defined in claim 1 wherein the step of adjusting the baseline of said signal output by the video camera comprises the step of adjusting the baseline of a signal output by a vidicon camera.

9. A method for improving the performance of video cameras as defined in claim 1 wherein the received optical signal comprises a laser beam signal.

10. An apparatus for improving the performance of video cameras used for making spatial measurements, such a video camera providing a received signal comprising noise and an optical signal, the apparatus comprising:
    means for acquiring the received signal from the video camera;
    means for digitizing the optical signal contained in the received signal;
    means for adjusting the baseline of the received signal such that all noise is represented by positive counts and the mean of the baseline is centered at a predetermined positive digital count to arrive at a baseline offset; and
    means for subtracting the baseline offset from subsequent frames to correct for baseline error such that both positive and negative signals are maintained while being processed so that substantially none of the optical signal is lost.

11. An apparatus for improving the performance of video cameras as defined in claim 10 further comprising means for improving the signal-to-noise ratio of the received signal.

12. An apparatus for improving the performance of video cameras as defined in claim 11 wherein the means for improving the signal-to-noise ratio of the received signal comprises:
    means for obtaining a plurality of frames each representing both said noise and the optical signal; and
    means for averaging the plurality of frames together to provide a representative signal wherein the optical signal is extracted from the noise.

13. An apparatus for improving the performance of video cameras as defined in claim 11 wherein the means for improving the signal-to-noise ratio of the output signal comprises:
  means for determining a plurality of resulting spatial measurement representations based upon the noise and optical signal; and
  means for averaging the plurality of spatial measurement representations wherein the optical signal is extracted from the noise.

14. An apparatus for improving the performance of video cameras as defined in claim 11 wherein the means for improving the signal-to-noise ratio of the received signal comprises means for averaging a line in the video camera.

15. An apparatus for improving the performance of video cameras as defined in claim 11 wherein the means for improving the signal-to-noise ratio of the received signal comprises means for averaging an area in the video camera.

16. An apparatus for improving the performance of video cameras as defined in claim 10 wherein the video camera comprises a CCD camera.

17. An apparatus for improving the performance of video cameras as defined in claim 10 wherein the camera comprises a vidicon camera.

18. An apparatus for improving the performance of video cameras as defined in claim 10 further comprising a digital processor configured for calculating parameters of a laser beam.

* * * * *